H. G. LEFFINGWELL.
BATTERY VISE.
APPLICATION FILED DEC. 15, 1920.

1,408,954.

Patented Mar. 7, 1922.
2 SHEETS—SHEET 1.

WITNESSES
E. A. Wilson
A. L. Kitchin

INVENTOR
HOWARD G. LEFFINGWELL
BY Munn&Co
ATTORNEYS

H. G. LEFFINGWELL.
BATTERY VISE.
APPLICATION FILED DEC. 15, 1920.
1,408,954.
Patented Mar. 7, 1922.
2 SHEETS—SHEET 2.
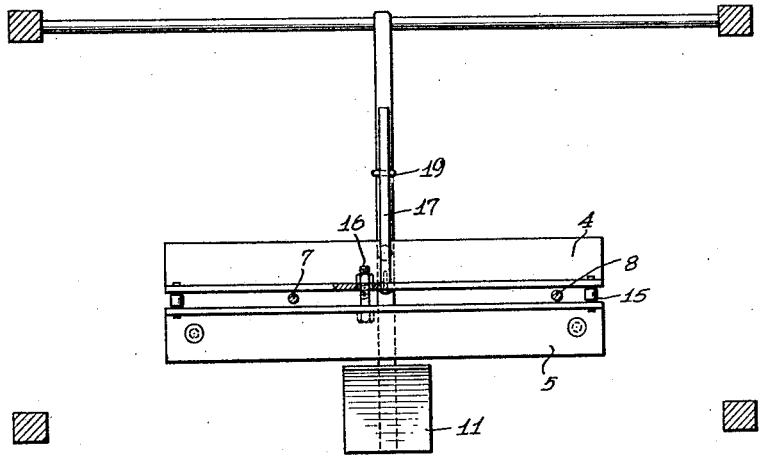
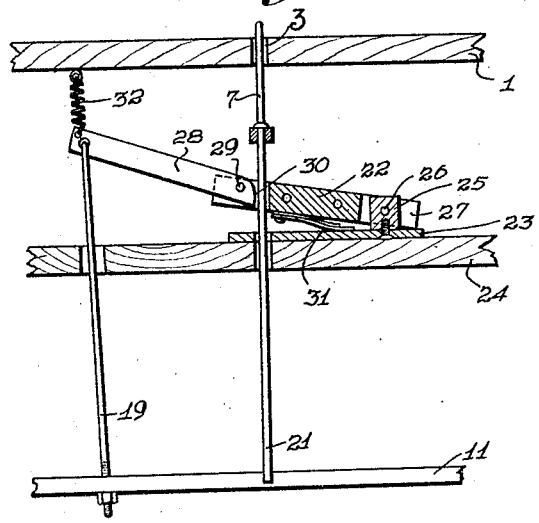
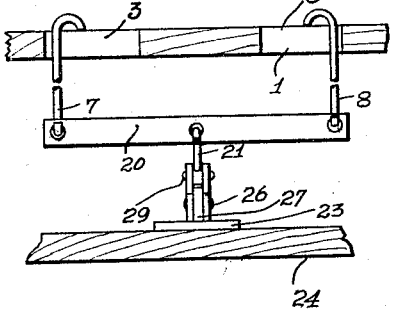
WITNESSES
E. A. Wilson
A. L. Kitchin
INVENTOR
HOWARD G. LEFFINGWELL
BY Munn & Co
ATTORNEYS

UNITED STATES PATENT OFFICE.

HOWARD G. LEFFINGWELL, OF GRAND JUNCTION, COLORADO.

BATTERY VISE.

1,408,954.    Specification of Letters Patent.    Patented Mar. 7, 1922.

Application filed December 15, 1920. Serial No. 430,818.

*To all whom it may concern:*

Be it known that I, HOWARD G. LEFFINGWELL, a citizen of the United States, and a resident of Grand Junction, in the county of Mesa and State of Colorado, have invented a new and Improved Battery Vise, of which the following is a full, clear, and exact description.

This invention relates to battery vises and has for an object to provide an improved simplified construction for holding a storage battery in position on a bench while being operated upon.

Another object in view is to provide an improved holding device for storage batteries which may be quickly applied when disconnected and which when applied will firmly hold the battery in place.

A further object of the invention is to provide an improved vise for holding batteries in place on a bench wherein the holding members are actuated by a foot pedal in such a manner as to cause the battery to be firmly clamped against the bench.

In the accompanying drawings—

Figure 3 is a sectional view through Figure 2 approximately on line 3—3.

Figure 4 is a fragmentary view somewhat similar to Figure 1 but showing a modified form of the invention to that illustrated in Figure 1.

Figure 5 is a front view of the construction shown in Figure 4.

Figure 2:
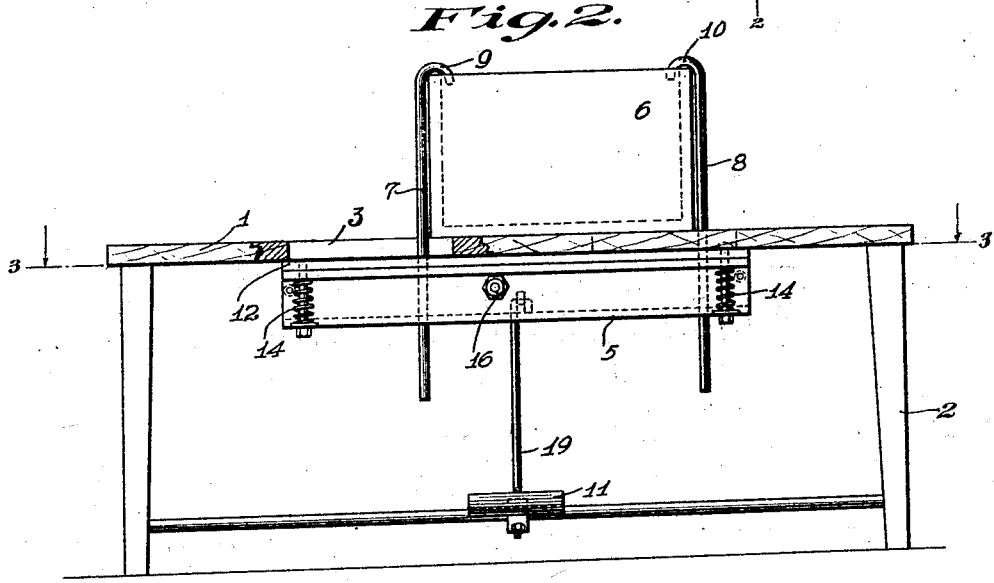
Figure 2 is a sectional view through Figure 1 approximately on line 2—2.

Referring to the accompanying drawings by numerals, 1 indicates a bench of any desired kind provided with suitable legs 2 and provided with slots 3 each approximately the length of the jaws 4, 5 whereby one-half the device may accommodate any desired size of battery 6. In the drawing, a very conventional showing of battery is provided in order to illustrate the invention. When it is desired to remove the contents of the battery or to operate on the battery in any desired manner, the same is placed on the bench 1 and the hold-down rods 7 and 8 placed in position as shown in Figure 2 or connected with the battery casing in any desired manner. The hook ends 9 and 10 of the respective rods are capable of ready engagement with the handle or other parts of the casing so that the casing may be properly held down while the contents are operated upon or are removed. After the hold-down rods 7 and 8 have been positioned as shown in Figure 2 the operator places his foot upon the pedal 11 and presses downward. This will cause the jaws 4 and 5 to grip the rods 7 and 8 and then pull said rods downwardly a short distance. It will be evident that this action will cause the casing of the battery 6 to be firmly clamped to the bench 1.

Figure 1:
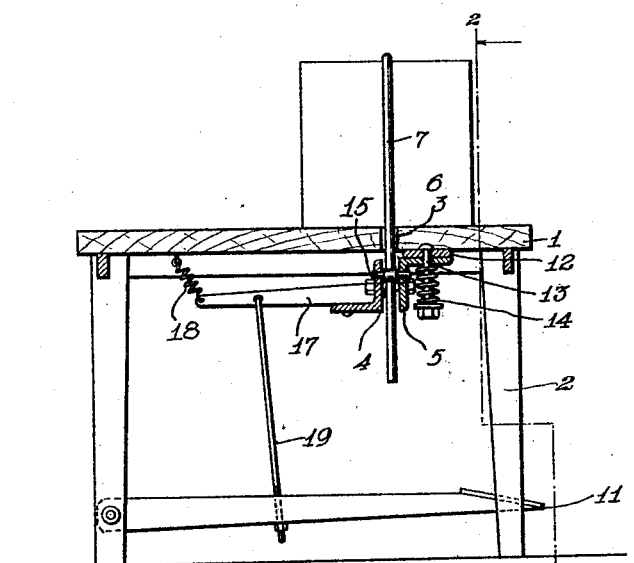
Figure 1 is a sectional view through a bench embodying one embodiment of the invention.

In order to cause the jaws 4, 5 to operate as just described they are mounted to swing together and then downwardly when the pedal 11 has been depressed. To accomplish this result the plate 12 is provided which is secured by screws or other means to the bottom of the bench 1 and which accommodates a pair of bolts 13, each bolt having a nut at the lower end which acts as a stop for the respective springs 14 surrounding the respective bolts and pressing against one section of the jaw 5, said rods passing through the jaw 5 as shown in Figure 1. The opening in the jaw 5 for accommodating the bolts 13 is appreciably larger than the rods so that the jaw 5 may swing downwardly a short distance, said swinging movement being against the action of the springs 14. Two or more pins 15 having large central sections are loosely fitted into aligned apertures in the jaws 4 and 5 as shown in Figure 1 so as to prevent the jaws at the upper part from moving together while permitting the jaws at their lower edges to approach and grip firmly the respective rods 7 and 8 whenever the pedal 11 is depressed.

To prevent any accidental complete separation of the jaws 4 and 5 a bolt 16 is loosely mounted in the jaws and acts to prevent the separation of the jaws beyond a certain point but readily permits the jaws to move towards each other and swing. A clamping lever 17 is rigidly secured to jaw 4 and has spring 18 connected with the outer end thereof, said spring being also connected with the bench 1 so that the lever 17 and jaw 4 will normally be held in a raised or inoperative position. A link 19 is connected with the lever 17 and adjustably connected with the pedal 11 whereby whenever said pedal is depressed lever 17 will be swung downwardly against the action of spring 18 and, consequently, the jaw 4 will be moved over towards jaw 5 for gripping the rods 7 and 8. After this gripping action has been completed the downward motion of pedal 11 and lever 17 continues and said downward motion causes the jaw 5 to swing downwardly a short distance against the action of the springs 14. By reason of this construction when the pedal 11 is depressed the rods 7 and 8 are first gripped and then moved downwardly a short distance for causing the casing of the battery to be firmly gripped and pressed against the bench. When the operation on the battery has been completed pressure on lever 17 is removed and all the parts will automatically move to an inoperative position under the action of the respective springs 14 and 18.

In Figures 4 and 5 will be seen a second embodiment of the invention in which the hold-down rods 7 and 8 are connected with an equalizing bar 20 which equalizing bar carries a pull rod 21, said rod extending preferably through the bar 20 and normally loosely through the gripping structure 22. This gripping structure comprises a plate 23 adapted to be secured to one of the braces 24 of the bench 1 and also rigidly secured to an upstanding lug 25 carrying a pivotal pin 26 extending through a locking bar 27. This locking bar is bifurcated at one end so as to straddle the lug 25 and readily receive the pin 26 while at the opposite end it is bifurcated for receiving the clamping lever 28, which clamping lever is pivotally connected at 29 to member 27. The end 30 of lever 28 is rounded as shown in Figure 4 so that whenever the pedal 11 is pulled downwardly motion will be transmitted through link 19 to the lever 28 for moving the same downwardly and causing the rounded end 30 to firmly grip or pinch the pull rod 21. After the pull rod 21 has been pinched as much as the parts will permit, any additional downward movement of the link 19 will cause the gripping member 27 to move downwardly on the pivotal pin 26 against the action of a spring 31. As the pull rod 21 is rigidly clamped in place this additional downward movement will cause said pull rod to be moved downward together with the equalizing bar 20 and the hold-down rods 7 and 8.

When it is desired to release the hold-down rods 7 and 8 pressure is removed from pedal 11 whereupon the springs 31 and 32 will restore the various parts to the position shown in Figure 4.

In all forms of the invention it is aimed to accommodate all sizes of batteries. In Figure 5 it will be noted that the equalizing bar 20 is made slightly longer than the longest battery which it is expected to hold. Preferably the lower ends of the hold-down rods 7 and 8 are formed into hooks which extend through suitable apertures adjacent the end of the equalizing bar, said apertures preferably being horizontal so as to allow a free and easy swinging action of the rods 7 and 8.

What I claim is:—

1. A storage battery vise comprising a pair of hold-down rods having interlocking ends, a gripping member for gripping said rods and foot operated means for moving the gripping means to a gripping position and then moving the hold-down rods to a lowered or clamped position.

2. A vise for batteries and the like comprising a pair of hold-down members, a pair of gripping jaws for gripping said members and means for substantially simultaneously closing said gripping jaws and moving said hold-down members downwardly.

3. A vise for clamping batteries to supports comprising a pair of hold-down rods formed with end sections adapted to engage the batteries, a pair of gripping jaws for gripping the hold-down members, a lever for closing said jaws and a foot operated member for swinging said lever to a closed position and then moving the same downwardly whereby said holding member will be moved downwardly for pressing the battery against the support.

4. A vise for batteries and the like comprising a pair of hold-down members for engaging and pressing the battery against a support, a pair of jaws for gripping said hold-down members, said jaws comprising a pair of angle iron structures, one of said angle iron structures being resiliently held in position, a lever connected with the other of said jaws, means for loosely holding the said jaws juxtapositioned, a lever for swinging one of said jaws towards the other so that the jaws will pinch said hold-down members and a foot operated member for swinging said lever and then moving the lever downwardly so as to swing both of said jaws after the jaws have been closed whereby the hold-down members are pulled downwardly a predetermined distance.

5. A vise for clamping batteries rigidly to supports comprising a pair of hold-down members, a pair of jaws for gripping said hold-down members, a plurality of fixed bolts extending through one of said jaws, a spring acting on said bolt along said last-mentioned jaw for resiliently holding the same in position, loosely arranged connecting means for holding said jaws juxtapositioned, a lever for swinging one of said jaws towards the other for gripping said hold-down means and a foot operated member for swinging said lever and for swinging both of said jaws simultaneously against the action said jaws simultaneously against the action of said springs whereby the hold-down members will be moved downwardly a short distance.

6. A vise for holding batteries rigidly on a support comprising a plurality of hold-down bars adapted to engage the battery, an equalizing bar connected to said hold-down bars, a pull rod connected with the equalizing bar, a gripping member adapted to grip said pull rod and foot operated means for actuating said gripping member so as to grip the rod and then move the gripping member, rod and parts connected therewith downwardly a predetermined distance.

7. A vise for holding batteries comprising a pair of hold-down rods interlocking with the battery, an equalizing bar connected with said hold-down rods, a pull rod connected with said equalizing bar, a pivotally mounted gripping member formed with an opening through which said pull rod extends, a gripping lever pivotally mounted on the gripping member and adapted to pinch the pull rod against the gripping member and a foot operated member for first actuating said lever and then moving said lever and gripping member together with pull rod and associated parts downwardly.

HOWARD G. LEFFINGWELL.